United States Patent [19]
Fiorda

[11] Patent Number: 5,166,714
[45] Date of Patent: Nov. 24, 1992

[54] UNDERWATER CAMERA HAVING THROUGH-THE-LENS VIEWING

[76] Inventor: John H. Fiorda, 3074 Van Buren Ave., Costa Mesa, Calif. 92626

[21] Appl. No.: 718,810

[22] Filed: Jun. 21, 1991

[51] Int. Cl.⁵ .................... G03B 17/08; G03B 17/44
[52] U.S. Cl. ...................................... 354/64; 354/161
[58] Field of Search ............... 354/64, 151, 161, 180, 354/181, 182, 220, 109

[56] References Cited

U.S. PATENT DOCUMENTS

| | | | |
|---|---|---|---|
| 1,885,286 | 11/1932 | Petit et al. | 354/181 |
| 1,900,730 | 3/1933 | Petit et al. | 354/181 |
| 2,287,640 | 6/1942 | Raynes | 354/181 |
| 3,650,186 | 3/1972 | Stelck | 354/109 |
| 3,759,605 | 9/1973 | Johnson | 354/64 |
| 4,947,783 | 8/1990 | Gell, Jr. | 354/64 X |
| 4,994,829 | 2/1991 | Tsukamoto | 354/64 |
| 5,027,139 | 6/1991 | Varouxis et al. | 354/64 |

Primary Examiner—Russell E. Adams
Assistant Examiner—Jae N. Noh
Attorney, Agent, or Firm—Roy A. Ekstrand

[57] ABSTRACT

An underwater camera includes a housing supporting an exposure mechanism therein. The exposure mechanism includes a support frame and a conventional film transport and shutter mechanism. A motor drive system is operative upon the film transport and shutter mechanism to alternatively raise or lower the transport mechanism with respect to the camera imaging lens. A viewer is optically coupled to the imaging lens. In one position of the film transport, a focusing screen is positioned in alignment with the imaging lens to provide through the lens viewing while in the alternative position of the film transport, the to-be-exposed film and shutter assembly is interposed between the imaging lens and the viewer to properly expose the film.

15 Claims, 4 Drawing Sheets

UNDERWATER CAMERA HAVING THROUGH-THE-LENS VIEWING

FIELD OF THE INVENTION

This invention relates generally to underwater photography and particularly to underwater cameras and camera systems used therein.

BACKGROUND OF THE INVENTION

The world of underwater photography presents one of the most difficult, if not the most difficult, environments in which to carry forward the photographic arts. However, the vast array of fascinating and exciting subjects which are available to photographers together with the enjoyment and challenge of underwater activity have continued to stimulate underwater photographers in a neverending quest for more and more interesting photographic subjects and settings. One of the significant challenges in the world of underwater photography is presented to the manufacturers of cameras adapted for use in this extremely harsh and demanding environment. Underwater cameras must, of course, maintain complete integrity or water-tight properties to preserve the internal operating mechanism and film. Since underwater photography often takes place at substantial depths, underwater cameras must be able to sustain a great pressure difference between the deep water outer environment and the sealed interior portion of the camera. In addition, underwater photography taking place in the ocean subjects the underwater camera to the corrosive actions of the ocean's salt water and other corrosive elements. Finally, since underwater cameras are operated by photographers who are also restricted in their ability to operate in this harsh environment due to equipment they wear and use to sustain and protect themselves, underwater cameras must be rugged and durable and must be made in a manner permitting easy manipulation and operation of the camera.

Thus far, however, underwater camera manufacturers have not provided cameras which readily meet these challenges of the underwater photographic environment. While the construction of underwater cameras differs somewhat between manufacturers, all generally include a water-tight housing which supports a camera mechanism therein. The camera mechanism includes a generally conventional film transport and shutter mechanism together with a viewer or range finder and an optical coupling system for the lens. In order to properly operate the camera mechanism, one or more control elements are often coupled through apertures in the housing between the exterior and interior of the water-tight housing. These apertures are sealed by various resilient sealing structures to protect the water-tight camera interior.

While underwater cameras have advanced through the years, their advance has generally lagged behind their above water counterparts in features and ease of operation due in part to the difficult environment in which underwater cameras must operate. For example, in non-underwater or above water cameras, most professional photographers and serious amateurs alike have available a vast array of cameras providing through-the-lens viewing which greatly enhances their capability. Through-the-lens viewing denotes those cameras in which the optical path for the photographer's viewing of the to-be-photographed image as well as the optical path to the to-be-exposed film, both proceed through the main camera lens. In contrast, non through-the-lens cameras, generally referred to as rangefinder or viewfinder cameras, provide separate optical paths and lens systems for the photographer's view of the to-be-photographed image. As a result, in non through-the-lens cameras, the photographer does not actually see the same image through the viewfinder as the exposed film will see through the main camera lens. While rangefinder or viewfinder-type cameras are adequate for the general public, serious amateurs and professional photographers including underwater photographers have substantial need of through-the-lens viewing to properly practice their art.

To meet the desire of underwater photographers for through-the-lens cameras, practitioners in the art have provided special housings which receive one or more types of single lens reflex cameras within a special dome housing. Single lens reflex cameras are extremely popular in the non-underwater arts and provide the most pervasive type of through-the-lens camera structure. Because of the compact dimensions of single lens reflex cameras, they are generally the camera of choice for inclusion within such domed housings. Single lens reflex cameras acquire their through-the-lens viewing capability by using a movable mirror within the film exposure optical path to divert the through-the-lens image to the viewer optical system prior to film exposure. At the time of film exposure, the lens pivots out of the optical path allowing the film to be exposed by the main camera lens image. While the use of single lens cameras within domed housings provides through-the-lens viewing, a problem arises in that the dome itself, which must of course be transparent, becomes an operative part of the camera optic system and, in essence, represents a lens which must be matched to the main camera lens to properly focus an image. The uncertainties and variations of this additional "lens" provided by the dome structure generally degrades the photographic image and has been found lacking by most professional underwater photographers.

It is generally believed that the most pervasive and popular underwater camera provided by camera manufacturers is the Nikonos V manufactured by the Nikon Corporation. The Nikonos V comprises a rangefinder or viewfinder camera which does not provide through-the-lens viewing but is nonetheless extremely popular. The camera provides a sealed housing together with manually operated shutter and film advance mechanisms, a mechanical exposure counter, and a an electronically controlled exposure system.

While the foregoing described prior art underwater cameras have, to some extent, facilitated underwater photography, they have in many instances failed to provide several of the important features enjoyed by cameras not adapted to the underwater photographic environment. There remains, therefore, a need in the art for an underwater camera which facilitates through-the-lens viewing without degrading image quality and which provides increased feature capability and ease of operation.

SUMMARY OF THE INVENTION

Accordingly, it is a general object of the present invention to provide an improved underwater camera. It is a more particular object of the present invention to provide an improved underwater camera which includes through-the-lens viewing and which is better adapted for operation in the underwater photographic environment.

In accordance with the present invention, there is provided a camera comprising a housing; a lens supported by the housing having an entrance and exit aperture for focusing an image at a focus plane; a film holder for holding a portion of to-be-exposed film; an image viewer optically coupled to the lens such that the image of the lens may be seen therethrough; a shutter having a shutter release for exposing the to-be-exposed film; and means responsive to the shutter release for moving the film holder between a first position in which the to-be-exposed portion of film therein is removed from the optical coupling path between the image viewer and the lens and a second position in which the to-be-exposed portion of film is interposed between the image viewer and the lens at the focus plane.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
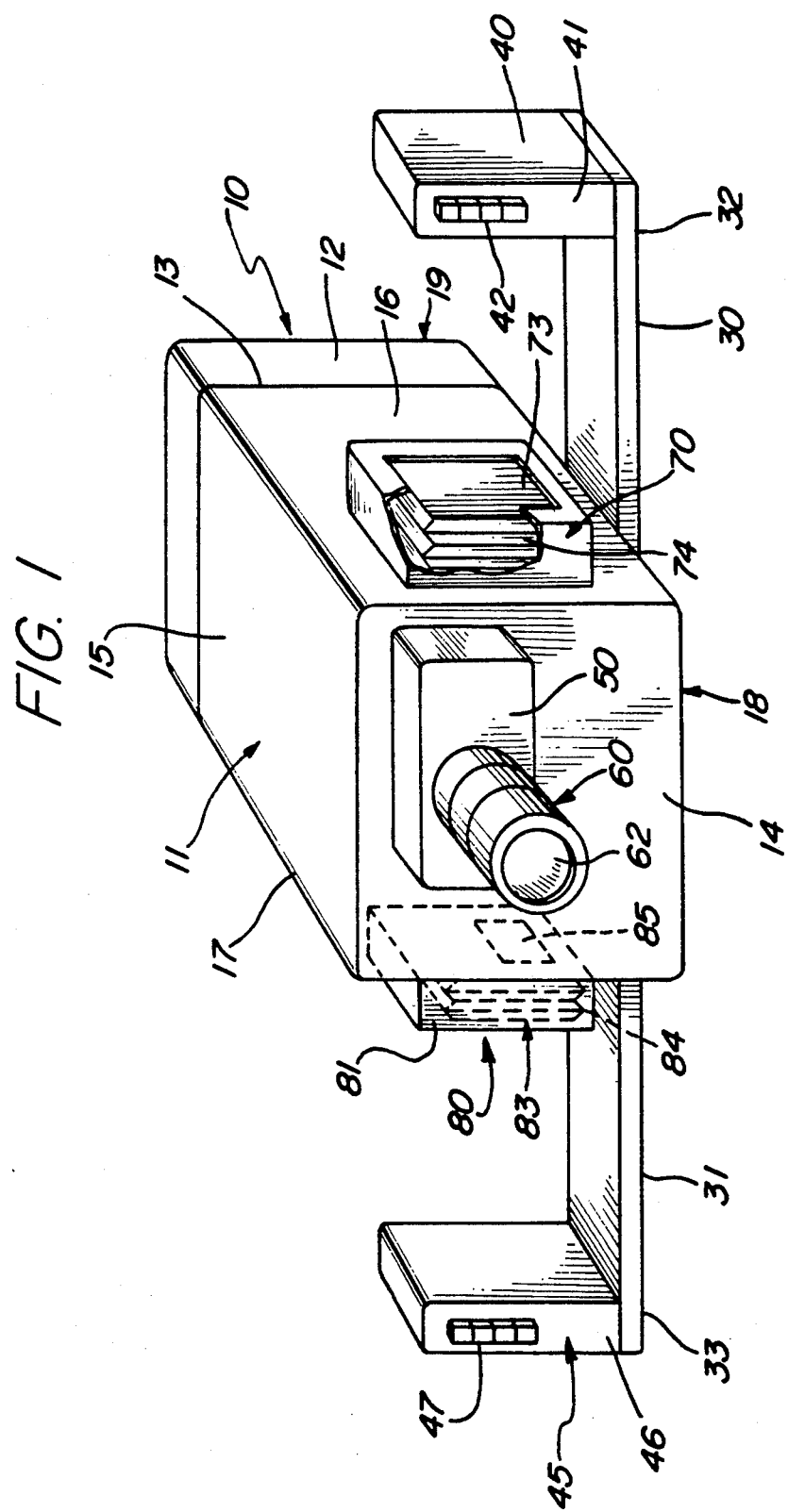
FIG. 1 sets forth a perspective view of an underwater camera constructed in accordance with the present invention.

FIG. 1 sets forth a perspective view of an underwater camera constructed in accordance with the present invention and generally referenced by numeral 10. Camera 10 includes a water-tight housing 11 defining an interior cavity (not shown). Housing 11 is generally rectangular in shape and defines a planar front surface 14, a top surface 15, side surfaces 16 and 17 and a bottom surface 18. A rear plate 12 defines a generally planar rear surface 19 and is secured to housing 11 in a water-tight attachment forming a water-tight seam 13. As is better set forth below in FIG. 4, rear surface 19 of rear plate 12 defines a sealed viewing aperture 20. Camera 10 further includes a lens control unit 50 supported upon front surface 14 and defining an aperture 51 therein. Aperture 51 receives an imaging lens 60 forming a water-tight attachment to front surface 14 in accordance with conventional fabrication techniques. In its preferred form, imaging lens 60 comprises a conventional lens of the type used on the above-mentioned Nikonos V underwater cameras. In further accordance with conventional fabrication techniques, lens 60 includes a generally cylindrical lens housing 61 which in turn supports a front piece 62 comprising a conventional front lens element.

A pair of grip supports 30 and 31 are secured to bottom surface 18 of housing 11 by a conventional attachment and terminate in end portions 32 and 33 respectively. In the manufacture of grip supports 30 and 31, they may, if desired, be formed of a single continuous elongated member or may be separate members secured to bottom 18 of housing 11 in accordance with design choice. In either event, end 32 of grip support 30 supports a grip 40 defining a generally rectangular vertically extending member having a front surface 41 which supports a plurality of control elements 42. Similarly, a generally rectangular grip 45 is secured to end 33 of grip support 31 by a conventional attachment and defines a front surface 46 supporting a plurality of control elements 47.

A pressure compensator 70 is secured to side 16 of housing 11 and includes a generally rectangular housing 71 defining an outer aperture 72 and an inner aperture (not shown) which provides communication between housing 71 and the interior of housing 11. A movable diaphragm 73 is coupled to a flexible bellows 74 in a sealed attachment within housing 71. While not seen in FIG. 1, it should be understood to those skilled in the art that bellows 74 is sealingly attached to housing 11 to maintain the water-tight seal of housing 11. Similarly, a second pressure compensator 80 which is identical to pressure compensator 70 is supported upon side surface 17 of housing 11. Pressure compensator 80 includes a rectangular housing 81 supporting a diaphragm 83 and a collapsible bellows 84 similar to diaphragm 73 and bellows 74 of pressure compensator 70. An aperture 85, shown in dashed line representation, is formed in side 17 and provides the above-mentioned communication between bellows 84 and diaphragm 83 with the interior of housing 11. It should be apparent to those skilled in the art that, while not visible in FIG. 1, a similar communicating aperture is provided for bellows 74 and diaphragm 73 within pressure compensator 70.

In operation, camera 10 forms an immersible underwater camera which, in accordance with the present invention, provides the user with the ability to view the to-be-photographed image through imaging lens 60 and thus provides the above-mentioned through-the-lens viewing. Housing 11, rear plate 12, diaphragm 73 and bellows 74, diaphragm 83 and bellows 84 as well as the water-tight attachment of imaging lens 60 to front surface 14 of housing 11 cooperate to maintain the interior cavity of housing 11 in a sealed water-tight environment. In accordance with the present invention and as is described below in greater detail, camera 10 includes a film transport and shutter mechanism which is operative in response to a selected one of control buttons 42 and 47 to permit through-the-lens viewing for operation of camera 10 as well as the correct exposure of film within camera 10 during the imaging process. In addition, selected ones of control buttons 42 and 47 are coupled to lens control unit 50 by conventional electrical wire connections or the like (not shown) to provide electrical control of lens control unit 50. In accordance with the structure set forth below in FIG. 5, an encoder driven motor drive within lens control unit 50 is operative upon imaging lens 60 to provide the required adjustments of aperture setting and focus to correctly image the to-be-photographed seam.

Thus, in its normal use, camera 10 is manipulated when submerged by the user gripping either or both of vertical grips 40 and 45 and manipulating control buttons 42 and 47 to provide adjustment of imaging lens 60 and to initiate film exposure in accordance with the structure set forth below. Pressure compensators 70 and 80 are operative to provide some adjustment of the pressure within the sealed environment of housing 11 in response to the depth at which camera 10 is utilized. In essence, pressure compensators 70 and 80 provide collapsible and expandable extensions of the cavity interior of housing 11 and permit volume adjustments which tend to compensate for external pressures upon camera 10. The object is to reduce the pressure difference between the external environment of camera 10 and the interior of housing 11 thereby permitting camera 10 to be used at greater depths. Of particular concern in such pressure considerations is the pressure differences which imaging lens 60 may normally withstand. Thus, through the operation of pressure compensators 70 and 80, the pressure differential imposed upon imaging lens 60 may be reduced thereby permitting its use at greater depth.

Bellows 74 and 84 are fabricated to collapsibly support diaphragms 73 and 83 against apertures 72 and 82 of pressure compensators 70 and 80. Thus, in the absence of substantial external pressure upon camera 10, bellows 74 and 84 are extended and the combined volume within housing 11 is maximum. As camera 10 is operated in deeper water, an increased external pressure is applied to the external elements of camera 10 including diaphragm 73 and 83. This increased pressure upon diaphragms 73 and 83 causes bellows 74 and 84 to begin collapsing or compacting inwardly. The collapse of bellows 74 and 84 reduces the combined volume of bellows 74 and 84 and the interior cavity of housing 11 causing an increase of the pressure of air trapped therein. This increase of pressure within housing 11 reduces the pressure difference between the external environment of camera 10 and the interior of housing 11. Thus, as camera 10 is operated at even greater depths, bellows 74 and 84 continue to collapse which in turn produces a compensating reduction of the combined volumes of bellows 74 and 84 and housing 11. Once again, this reduced volume provides a pressure increase within housing 11 which acts to further reduce the pressure differential between the interior of housing 11 and its external environment. The degree of compensation provided by pressure compensators 70 and 80 is related to the relative volumes of bellows 74 and 84 and the interior cavity of housing 11. Thus, while complete pressure compensation may not be achievable, even relatively small volume pressure compensators can provide a significant reduction of the pressure differential between the exterior environment of camera 10 and the interior thereof.

Figure 2:
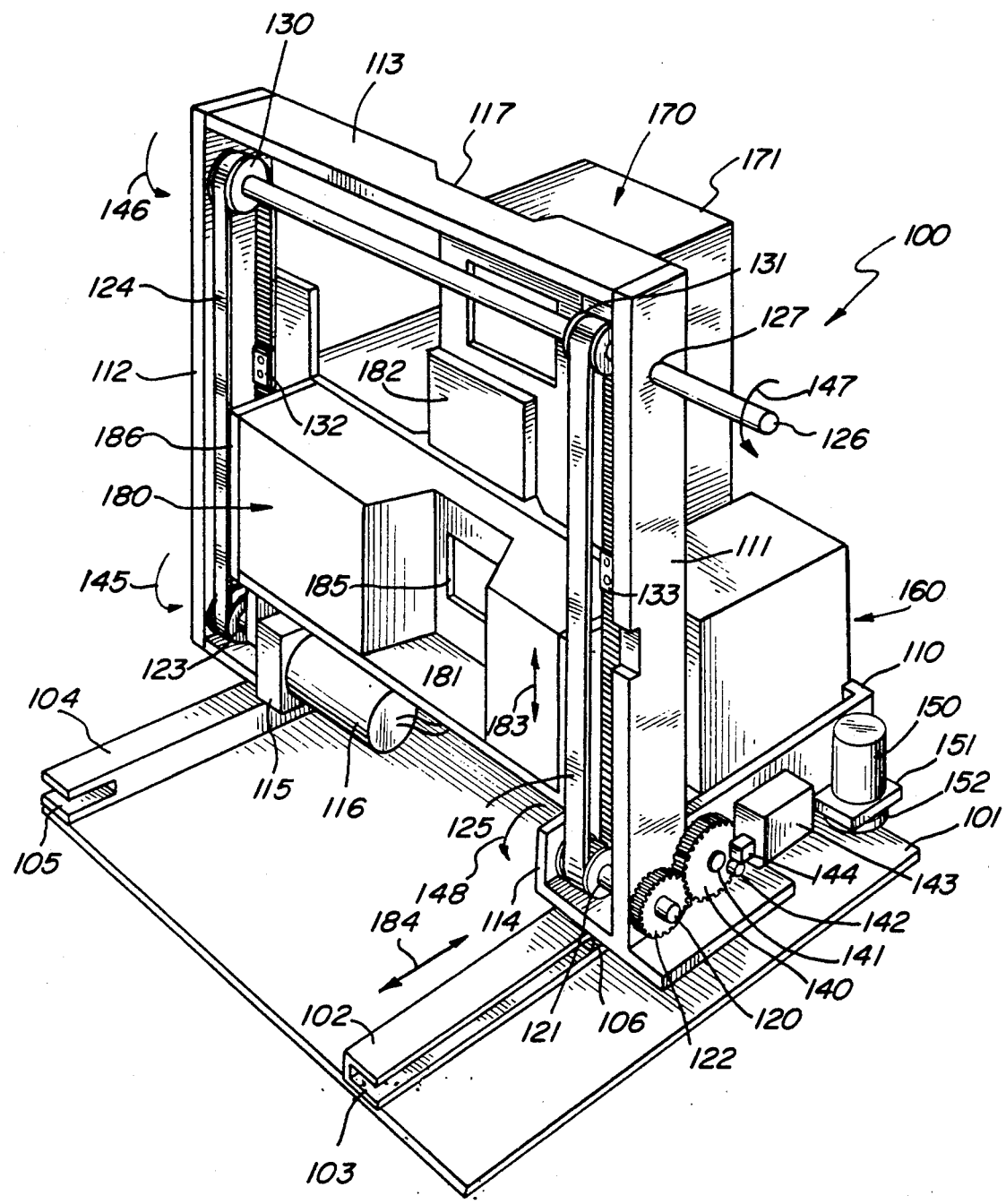
FIG. 2 sets forth a partially sectioned perspective view of the present invention underwater camera in the lowered or focusing and viewing position.

FIG. 2 sets forth a perspective view of the exposure mechanism within camera 10 constructed in accordance with the present invention and generally referenced by numeral 100. For purposes of discussion, exposure mechanism 100 is shown removed from housing 11 (seen in FIG. 1). Exposure mechanism 100 includes a generally planar base plate 101 having a generally rectangular configuration and preferably formed of a rigid material such as steel or the like. A pair of generally U-shaped support rails 102 and 104 are secured to the upper surface of base plate 101 and define respective outwardly facing channels 103 and 105. A support carriage 110 defines a generally planar member extending above rails 102 and 104. A plurality of guide members such as guide 106 are secured to the underside of carriage 110 and extend into channels 103 and 105 of rails 102 and 104 to provide a sliding support attachment between carriage 110 and rails 102 and 104. Thus, carriage 110 is slidably movable upon rails 102 and 104 in the directions indicated by arrows 183. Carriage 110 further supports a pair of vertical support members 111 and 112 and a horizontal support member 113. Support members 111, 112 and 113 are securely attached to carriage 110 forming a strong rigid structural member. Vertical support 111 defines an aperture 127 while vertical support 112 defines a similar aperture 128 near the top portions thereof. An elongated cylindrical shaft 126 is received within apertures 127 and 128 and is rotatably secured therein. A pair of gear pulleys 130 and 131 are secured to shaft 126 within vertical supports 111 and 112. A shaft 120 is similarly supported at the lower end of vertical support 111 and rotatable therein. Carriage 110 further includes a vertical plate 114 which defines a similar aperture (not shown) which receives the remaining end of shaft 120. A gear pulley 121 is secured to shaft 120 and rotatable therewith. An outer gear 122 is secured to shaft 120 outside vertical support 111. A motor mount 115 is secured to the underside of carriage 110 and receives and supports a bidirectional electric motor 116. Motor 116 in turn supports a gear pulley 123. A toothed belt 124 defining a plurality of inwardly facing gear teeth 134 is received upon and forms a continuous path about gear pulleys 123 and 130. Similarly, a continuous toothed belt 125 is received upon and forms a continuous encirclement of gear pulleys 121 and 131.

An elongated open transport bracket 186 extends between vertical supports 111 and 112 and is secured to belts 124 and 125 by a pair of attachments 132 and 133. It will be apparent to those skilled in the art that any of the presently available attachment mechanisms may be used to secure transport bracket 186 to belts 124 and 125. A film transport mechanism 180, which in its preferred form comprises the film transport and shutter assembly of a Nikonos V camera, is secured within transport bracket 186. Film transport mechanism 180 includes conventional film transporting and shuttering means (not shown). Film transport mechanism 180 further includes a shutter aperture 185 within which a movable shutter 181 is supported in accordance with conventional fabrication techniques. A focus screen 182 is supported along the upper edge of transport bracket 186 and in accordance with an important aspect of the present invention is vertical aligned with the vertical plane of shutter 181.

A film magazine 160 is received upon and secured to carriage 110 and defines an interior cavity (not shown) for supporting a quantity of conventional film. A viewer 170 includes a generally rectangular vertically extending housing 171 received upon and supported by carriage 110. Viewer housing 171 defines an aperture 172 positioned in line with and close to focus screen 182. As is set forth below in FIG. 4, viewer housing 171 further includes a viewing aperture 20 on the rear side thereof. As is also set forth below in greater detail, viewer 170 includes an optical coupling path which couples light received through aperture 172 to viewing aperture 20 such that the user looking into viewing aperture 20 is able to view the focus image upon focus screen 182 so long as exposure mechanism 100 is configured in the manner shown in FIG. 2.

A gear 140 is supported upon carriage 110 by a shaft 141. Gear 140 is proximate to and engaged with gear 122 supported upon shaft 120. A generally cylindrical stop pin 142 is supported on the outer edge of gear 140. A limit switch 143 includes a forwardly extending actuator member 144 and is supported upon carriage 110. A carriage motor 150 comprises a conventional bidirectional motor and is supported upon flange 151 of carriage 110. A drive wheel 152 is coupled to motor 150 and is further coupled to rail 102 to provide motion of carriage 110 upon rails 102 and 104 in the directions indicated by arrows 184.

Figure 3:
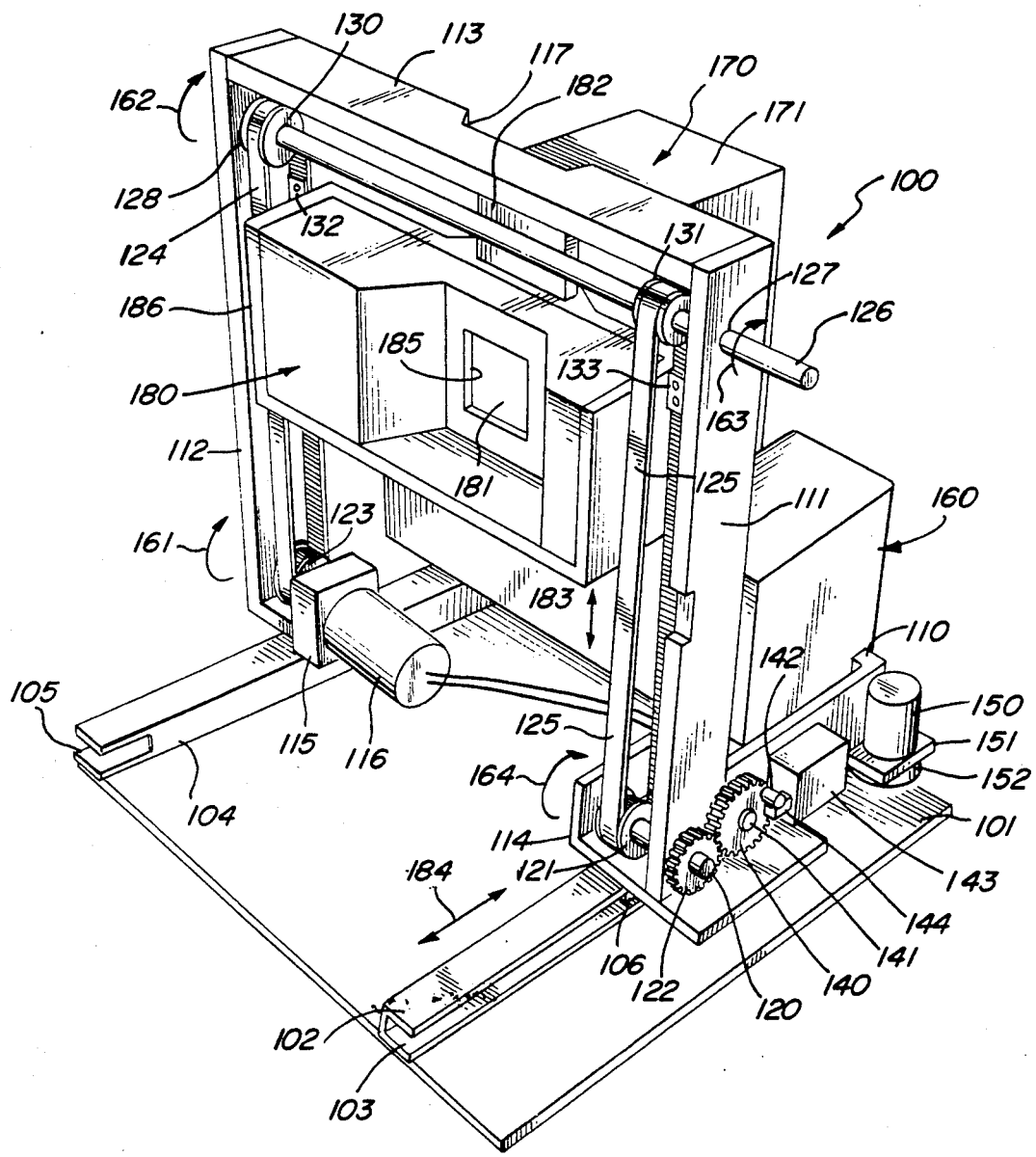
FIG. 3 sets forth a partially sectioned perspective view of the present invention underwater camera in the raised or film exposing position.

The operation of exposure mechanism 100 is best understood by simultaneous reference to FIGS. 2 and 3. As mentioned above, FIG. 2 sets forth the configuration of exposure mechanism 100 when the user is previewing the to-be-photographed scene through viewing aperture 20 and imaging lens 60 (the latter seen in FIG. 1). In this position, film transport mechanism 180 is lowered to its lowest position which in turn positions focus screen 182 in alignment with aperture 172 of viewer 170. Thus, as the imaged light is coupled by lens 60 to focus screen 182, the focused image is viewable through aperture 172 of viewer 170 by means set forth below in greater detail. Thus, in the position of FIG. 2, shutter aperture 185 and shutter 181 of film transport mechanism 180 is out of alignment with the optical path of imaging lens 60. In contrast, FIG. 3 sets forth the configuration of exposure mechanism 100 during the exposing of a film frame. As can be seen by comparison of FIGS. 2 and 3, FIG. 3 is characterized by the raising of film transport mechanism 180 which aligns shutter aperture 185 and shutter 181 within the optical path of lens 60. In essence, shutter aperture 185 and shutter 181 have, in FIG. 3, taken the place previously occupied by focus screen 182 in FIG. 2. Thus, in accordance with an important aspect of the present invention, exposure mechanism 100 may alternatively place focus screen 182 or shutter aperture 185 and shutter 181 in alignment with the optical path of imaging lens 60.

Specifically, in the position shown in FIG. 2, film transport mechanism 180 occupies its lowest position and focus screen 182 is aligned with aperture 172. Thus, as set forth above, a focused image appears upon screen 182 due to lens 60 (seen in FIG. 1). In accordance with the present invention, the activation of the shutter release within control buttons 42 and 47 energizes motor 116 causing gear pulley 123 to rotate in the direction indicated by arrow 145. The coupling between gear pulleys 123 and 130 provided by toothed belt 124 causes gear pulley 130 to rotate in the direction indicated by arrow 146. Correspondingly, the motion of belt 124 raises attachment 132 which in turn produces a lifting force upon transport bracket 186. Concurrently, the rotation of gear pulley 130 in the direction of arrow 146 is coupled to gear pulley 131 by shaft 126 causing it to rotate in the direction indicated by arrow 147. The rotation of gear pulley 131 is coupled to gear pulley 121 by belt 125 causing gear pulley 121, shaft 120 and gear 122 to rotate in the direction indicated by arrow 148. The motion of belt 125 in response to the rotation of gear pulley 131 raises attachment 133 which is coupled to transport bracket 186 resulting in a lifting force being applied thereto. Thus, as motor 116 is energized and rotates, a lifting force is applied to transport bracket 186 raising film transport mechanism 180 upwardly. The rotation of motor 116 continues and film transport mechanism 180 is raised to the position shown in FIG. 3. As gear 122 is rotated in the above-described operation, a rotational force is applied to gear 140 which in turn moves stop 142 clockwise about shaft 141 until stop 142 contacts actuator 144 thereby operating limit switch 143. By means not shown but in accordance with conventional fabrication techniques, limit switch 143 is operative to interrupt the energizing of motor 116.

With comparison of FIGS. 2 and 3, it will be apparent to those skilled in the art that gears 122 and 140 as well as the relative positions of stop 142 and actuator 144 are selected to cause switch 143 to operate in correspondence with the desired raised position of film transport mechanism 180.

Once film transport mechanism 180 is raised to the position shown in FIG. 3, the conventional shutter mechanism within film transport mechanism 180 is actuated removing shutter 181 and exposing the film frame within shutter aperture 185. Thereafter, in further accordance with conventional fabrication techniques, shutter 181 closes and once again covers shutter aperture 185 completing film exposure. Upon the completion of film exposure, motor 116 is energized in the opposite direction to that used to raise film transport mechanism 180. Accordingly, the energizing of motor 116 rotates gear pulley 123 in the direction indicated by arrow 161. The above-described belt coupling of belt 124 causes a corresponding rotation of gear pulley 130 in the direction of arrow 162 and lowers attachment 132. In addition, the rotation of gear pulley 130 in the direction of arrow 162 rotates shaft 126 and gear pulley 131 in the direction indicated by arrow 163. Once again, the rotation of gear pulley 131 is coupled to gear pulley 121 by belt 125 causing shaft 120, gear 122 and gear pulley 121 to rotate in the direction indicated by arrow 164. As motor 116 continues to be energized and the abovementioned rotations of gear pulleys 123, 130, 131 and 121 take place, belts 124 and 125 cause film transport mechanism 180 to be lowered toward the position shown in FIG. 2. In addition, the rotation of gear 122 in the direction indicated by arrow 164 causes an opposite direction rotation of gear 140. The energizing of motor 116 continues until stop 142 is rotated in the counterclockwise direction and reaches actuator 144. The interaction of stop 142 and actuator 144 again operates limit switch 143 which in turn interrupts the energizing of motor 116. At this point, exposure mechanism 100 has returned to the viewing position shown in FIG. 2.

Thus, in accordance with an important aspect of the present invention, the user is provided with through-the-lens viewing because of exposure mechanism 100's capability to alternatively place focusing screen 182 or shutter aperture 185 in alignment with imaging lens 60 (seen in FIG. 1) and aperture 172 of viewer 170. The raising and lowering of film transport 100 occurs relatively quickly once the shutter release is actuated and, in its preferred form, rises quickly to the exposure position of FIG. 3 and thereafter returns quickly to the viewing position shown in FIG. 2. It will be apparent to those skilled in the art that a variety of mechanical configurations may be visualized which will carry forward the inventive operation of exposure mechanism 100 in which the film transport is moved relative to the imaging lens and viewing system optical coupling path.

As mentioned above, carriage 110 is movable in a sliding engagement with rails 102 and 104. In further accordance with the present invention, motor 150 is supported upon a flange 151 secured to carriage 110. Motor 150 further supports a drive wheel 152 which is physically coupled to rail 102 by a conventional drive wheel mechanism. The essential feature of motor 150 and the drive mechanism of drive wheel 152 is to provide movement of carriage 110 upon rails 102 and 104 when motor 150 is energized. Thus, in accordance with an important aspect of the present invention, carriage 110 and film transport mechanism 180 together with viewer 170 and film magazine 160 are movable as a single unit in the directions indicated by arrows 184. This capability to move the entire assembly back and forth upon rails 102 and 104 achieves a magnification or macro imaging capability previously obtained only with extension tubes or the like. Thus, as motor 150 is energized moving carriage 110 upon rails 102 and 104, the magnification of imaging lens 60 (seen in FIG. 1) is altered without the need for extension tubes, bellows or the like.

Figures 4, 5:
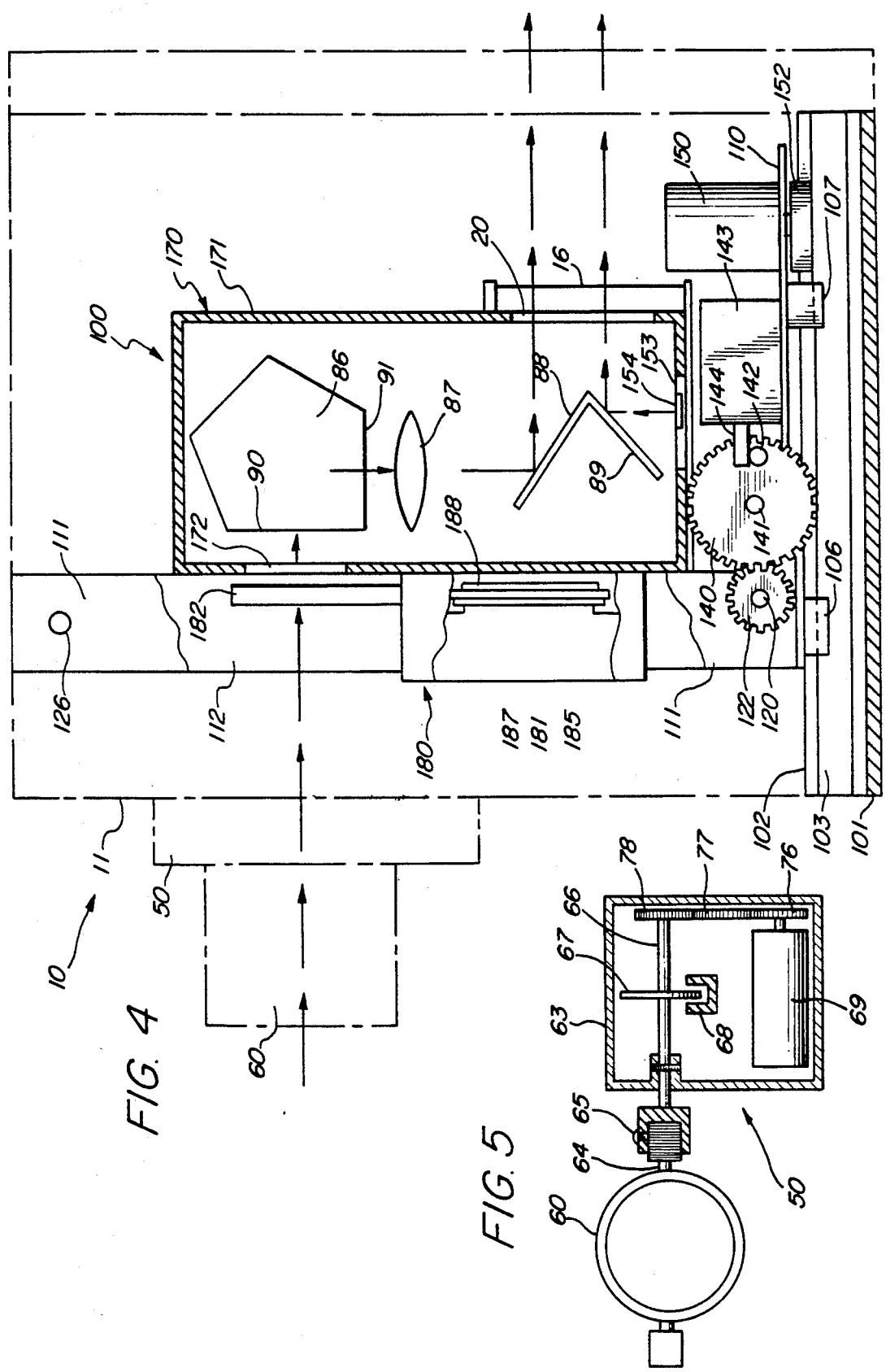
FIG. 4 sets forth a section view of the present invention underwater camera taken along section lines 4-4 in FIG. 1.
FIG. 5 sets forth a perspective view of the lens operating mechanism of the present invention underwater camera.

FIG. 4 sets forth a partially sectioned view of exposure mechanism 100. A planar base plate 101 supports a pair of rails 102 and 104 (the latter seen in FIG. 2). A carriage 110 is supported in a slidable attachment to rails 102 and 104 by a plurality of guide members 106 and 107. It will be apparent to those skilled in the art that while not seen in FIG. 4, additional guide members such as guides 106 and 107 are supported in combination with rail 104 to complete the sliding attachment of carriage 110 thereto. Carriage 110 supports a pair of vertical supports 111 and 112 described above. As is also described above, vertical supports 111 and 112 support a shaft 126 which extends horizontally therebetween. A shaft 120 within support 111 rotatably supports a gear 122. Gear 122 is coupled to a rotatable gear 140 which is supported by a shaft 141. Gear 140 further includes a limit stop 142. A limit switch 143 is supported upon carriage 110 and includes an actuator 144 extending therefrom. A motor 150 is supported upon carriage 110 and is coupled to a drive wheel 152. Wheel 152 engages or frictionally contacts rail 102 to provide motion of carriage 110 upon rails 104 and 102 when motor 150 is energized.

A film transport mechanism 180 described above includes a shutter aperture 185, a movable shutter 181 and a backing plate 188. In accordance with conventional fabrication techniques, a film portion 187 is captivated between shutter 181 and backing plate 188. As is also described above, film transport mechanism 180, in its preferred form, comprises the film transport and shutter assembly of a Nikonos V camera. A focus screen 182 extends upwardly from film transport 180 and is supported in combination therewith.

A viewer 170 includes a generally rectangular housing 171 having a front aperture 172 in the upper portion thereof and a viewing aperture 20 in the lower rear portion thereof. Housing 171 further supports a numeric display mechanism 153 supporting a plurality of display segments 154. In its preferred form, display 153 utilizes display segments 154 formed of light emitting diodes or LED's arranged to provide numeric information. A pair of mirrors 88 and 89 are supported within housing 171 and a lens 87 is interposed between mirror 88 and pentaprism 86. Pentaprism 86 is a conventional five-sided prism which provides the redirection of light from its forward face 90 to its lower or downwardly facing face 91.

To facilitate the descriptions which follow, housing 11, lens control unit 50 and lens 60 are shown in dashed line representation surrounding exposure mechanism 100.

In operation, camera 10 is initially used in the viewing configuration shown in FIG. 4 and also in FIG. 2 in which film transport 180 is supported within exposure mechanism 100 in the lower position. When so positioned, focus screen 182 is aligned with aperture 172 of viewer 170. Thus, in the position shown, light received by lens 60 is focused upon focus screen 182 in accordance with the operation of lens control unit 50. The light from the focused image upon screen 182 is received at surface 90 of pentaprism 86 and by internal reflection is redirected downwardly exiting surface 91 of prism 86. Lens 87 couples the output light of prism 86 to mirror 88 wherein the incident light on mirror 88 is reflected outwardly from viewer 170 through aperture 20. Thereafter, the reflected light from mirror 88 continues outwardly from housing 11 through a rear viewing glass (not shown) within backplate 12.

Thus in the position shown, the viewer may operate the above-described controls to actuate lens control unit 50 and manipulate lens 60. In addition, the user may energize motor 150 to rotate wheel 152 and move exposure mechanism 100 with respect to lens 60. This motion provides the above-described macro function and accomplishes the magnification of the image received by lens 60 without the use of extension tubes or the like. Simultaneously, the energizing of numeric display 153 provides reflection of the light produced by display segments 154 upon mirror 89 to be visible upon aperture 20 and provide information on exposure setting, exposure number and other relevant information desired by the user.

Once the to-be-photographed image is properly set up and the camera properly configured, the user is ready to shoot the desired exposure. It should be noted that, in accordance with an important aspect of the present invention, the ability of the present invention exposure mechanism positions film transport 180 and focus screen 182 in a lowered position with respect to viewer 170 and thereby provides through-the-lens viewing for the user in which the to-be-photographed scene is viewed through the main imaging lens 60. Thereafter, the initiation of film exposure by pressing the selected one of control buttons 42 or 47 (seen in FIG. 1) commences the exposure operation described above. As set forth above, the initiation of the exposure operation energizes motor 116 (seen in FIG. 2) which raises film transport 180 and focus screen 182 upwardly with respect to viewer 170. Concurrently, gears 122 and 140 are rotated as film transport 180 is raised. The rotation of gear 140 during the raising of film transport 180 moves limit stop 142 in the clockwise direction eventually reaching actuator 144 and operating limit switch 143. As is also described above, limit switch 143 is operative to interrupt the energizing of motor 116 suspending further motion of film transport 180. Thus, in accordance with an important aspect of the present invention, limit switch 143 stops motor 116 at the point of operation which properly aligns shutter aperture 185 and shutter 181 of film transport 180 in proper relationship with lens 60. Thereafter, in accordance with conventional fabrication techniques, the shutter mechanism of film transport mechanism 180 is actuated causing shutter 181 to be moved exposing film 187. Once exposure is complete, shutter 181 returns and motor 116 is again energized causing film transport mechanism 180 to be lowered in a cycle which is terminated as limit stop 142 is moved counterclockwise upon gear 140 and eventually returns to actuator 144. The movement of actuator 144 again operates switch 143 terminating the motion of film transport 180 and completing an exposure cycle.

Thus, it will apparent to those skilled in the art that, in accordance with the present invention, the above-described through-the-lens viewing is carried forward and is accomplished by the novel mechanism which moves the film transport and shutter assembly in and out of alignment with the main imaging lens.

FIG. 5 sets forth a pictorial view of the structure of lens control unit 50. It will be apparent to those skilled in the art that additional mechanical arrangement for lens control unit 50 may be utilized without departing from the spirit and scope of the present invention. Lens 60 includes a lens setting shaft 64 which, in accordance with conventional fabrication techniques, is coupled to the operative mechanisms of lens 60. Lens control unit 50 includes a housing 63 supporting a rotating shaft 66. Shaft 66 is supported by a sealed bearing 75 and further supports an encoder disk 67 and a gear 78. An optical reader 68, constructed in accordance with conventional fabrication techniques, is optically coupled to encoder disk 67. An electric motor 69 is supported within housing 63 and is coupled to a drive gear 76. A gear 77 couples gears 76 and 78.

In operation, the energizing of motor 69 rotates gears 76, 77 and 78 causing shaft 66 to be correspondingly rotated. The rotation of shaft 66 is coupled by coupling 65 to shaft 64 of lens 60. Thus, the energizing of motor 69 causes a change in the setting of lens 60 such as focus adjustment or the like. As motor 69 is energized and shaft 66 is rotated, encoder disk 67, which in its preferred form includes a plurality of contrasting encoder marks disposed thereon, is rotated past optical reader 68. In its preferred form, optical reader 68 includes a conventional LED and phototransistor pair (not shown) which provide output signals indicative of the movement of encoder disk 67. Thus, in accordance with conventional optical encoder processes, the setting of lens 60 may be accomplished by selectively energizing motor 69.

What has been shown is a novel underwater camera which provides the benefits of through-the-lens viewing as well as pressure compensation to enhance the performance of underwater cameras significantly. The mechanism provided accomplishes through-the-lens viewing by selectively moving the film transport and shutter mechanism within the optical path of the main imaging lens.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A camera comprising:
   a housing;
   a lens supported by said housing having an entrance and exit aperture for focusing an image at a focus plane;
   a film strip holder for holding a film strip having a portion thereof forming a to-be-exposed film portion;
   an image viewer optically coupled to said lens such that the image of said lens may be seen therethrough;
   a shutter having a shutter release for exposing said to-be-exposed film portion; and
   exposure means responsive to said shutter release for vertically moving said film holder to define a linear vertical path between a first lowered position in which said to-be-exposed film portion is removed from the optical coupling path between said image viewer and said lens and a second raised position in which said to-be-exposed film portion is interposed between said image viewer and said lens at said focus plane.

2. A camera as set forth in claim 1 wherein said exposure means further includes a focusing screen and wherein said focusing screen is interposed between said image viewer and said lens at said focus plane when said film holder is in said first position.

3. A camera as set forth in claim 2 wherein said exposure means includes means for raising and lowering said film holder and said focus screen.

4. A camera as set forth in claim 3 wherein said focus screen is secured to said film holder in vertical alignment with said focus plane.

5. A camera as set forth in claim 4 wherein said image viewer includes an upper aperture aligned with said lens and a lower aperture vertically displaced therefrom and light coupling means therebetween.

6. A camera as set forth in claim 5 wherein said focus screen is supported above said film holder.

7. A camera as set forth in claim 1 wherein said housing defines a water-tight enclosure having an aperture therein and wherein said camera further includes an external pressure compensator having a collapsible bellows sealingly coupled to said aperture and having an interior chamber, said bellows collapsing as external pressure increases.

8. A camera as set forth in claim 7 wherein said pressure compensator includes:
   a support housing external to said housing having an aperture exposed to the exterior thereof.

9. A camera as set forth in claim 8 wherein said camera further includes:
   a pair of pistol grip handles;
   means for supporting said pistol grip handles on each side of and spaced from said housing; and
   a plurality of user operated controls supported upon said pistol grip handles for operating said camera.

10. An underwater camera comprising:
    a sealed housing defining a water-tight interior cavity;
    a lens supported by said housing having an entrance and exit aperture for focusing an image at a focus plane sealingly coupled to said housing;
    a film holder and transport for holding and moving a film strip to position portions thereof for exposure;
    an image viewer optically coupled to said lens such that the image of said lens may be seen therethrough;
    a shutter mechanism supported upon said film holder having a shutter release for exposing portions of said film strip; and
    exposure means responsive to said shutter release for moving said film holder and said film strip in a straight-line vertical path between a first lowered position in which the to-be-exposed portion of said film strip therein is removed from the optical coupling path between said image viewer and said lens and a second raised position in which the to-be-exposed portion of said film strip is interposed between said image viewer and said lens at said focus plane.

11. A camera as set forth in claim 10 wherein said exposure means further includes a focusing screen and wherein said focusing screen is interposed between said image viewer and said lens at said focus plane when said film holder is in said first position.

12. A camera as set forth in claim 11 wherein said exposure means includes means for raising and lowering said film holder and said focus screen.

13. A camera as set forth in claim 12 wherein said focus screen is secured to said film holder in vertical alignment with said focus plane.

14. A camera as set forth in claim 13 wherein said image viewer includes an upper aperture aligned with said lens and a lower aperture vertically displaced therefrom and light coupling means therebetween.

15. A camera as set forth in claim 14 wherein said focus screen is supported above said film holder.

* * * * *